US009934146B2

(12) United States Patent
Steely, Jr. et al.

(10) Patent No.: US 9,934,146 B2
(45) Date of Patent: Apr. 3, 2018

(54) HARDWARE APPARATUSES AND METHODS TO CONTROL CACHE LINE COHERENCY

(71) Applicant: INTEL CORPORATION, Santa Clara, CA (US)

(72) Inventors: Simon C. Steely, Jr., Hudson, NH (US); Samantika S. Sury, Westford, MA (US); William C. Hasenplaugh, Boston, MA (US)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 14/498,946

(22) Filed: Sep. 26, 2014

(65) Prior Publication Data

US 2016/0092354 A1 Mar. 31, 2016

(51) Int. Cl.
*G06F 12/08* (2016.01)
*G06F 12/0817* (2016.01)
*G06F 12/0811* (2016.01)

(52) U.S. Cl.
CPC ...... *G06F 12/0824* (2013.01); *G06F 12/0811* (2013.01); *G06F 2212/1024* (2013.01); *G06F 2212/1048* (2013.01); *G06F 2212/2542* (2013.01)

(58) Field of Classification Search
CPC .................. G06F 12/0815–12/0828
See application file for complete search history.

(56) References Cited

U.S. PATENT DOCUMENTS

| 5,680,576 | A | * | 10/1997 | Laudon | G06F 12/0817 711/124 |
| 6,061,765 | A | * | 5/2000 | Van Doren | G06F 12/0822 711/141 |
| 6,546,465 | B1 | * | 4/2003 | Bertone | G06F 12/0828 711/144 |
| 8,493,397 | B1 | * | 7/2013 | Su | G06F 3/14 345/530 |
| 9,275,003 | B1 | * | 3/2016 | Hemmert | G06F 12/0868 |
| 9,323,679 | B2 | * | 4/2016 | Khailany | G06F 12/0859 |
| 2007/0083717 | A1 | * | 4/2007 | Rajamony | G06F 12/0822 711/141 |
| 2014/0052920 | A1 | | 2/2014 | Steely, Jr. et al. | |

* cited by examiner

*Primary Examiner* — Nicholas Simonetti
(74) *Attorney, Agent, or Firm* — Nicholson de Vos Webster & Elliott LLP

(57) ABSTRACT

Methods and apparatuses to control cache line coherency are described. A processor may include a first core having a cache to store a cache line, a second core to send a request for the cache line from the first core, moving logic to cause a move of the cache line between the first core and a memory and to update a tag directory of the move, and cache line coherency logic to create a chain home in the tag directory from the request to cause the cache line to be sent from the tag directory to the second core. A method to control cache line coherency may include creating a chain home in a tag directory from a request for a cache line in a first processor core from a second processor core to cause the cache line to be sent from the tag directory to the second processor core.

25 Claims, 13 Drawing Sheets

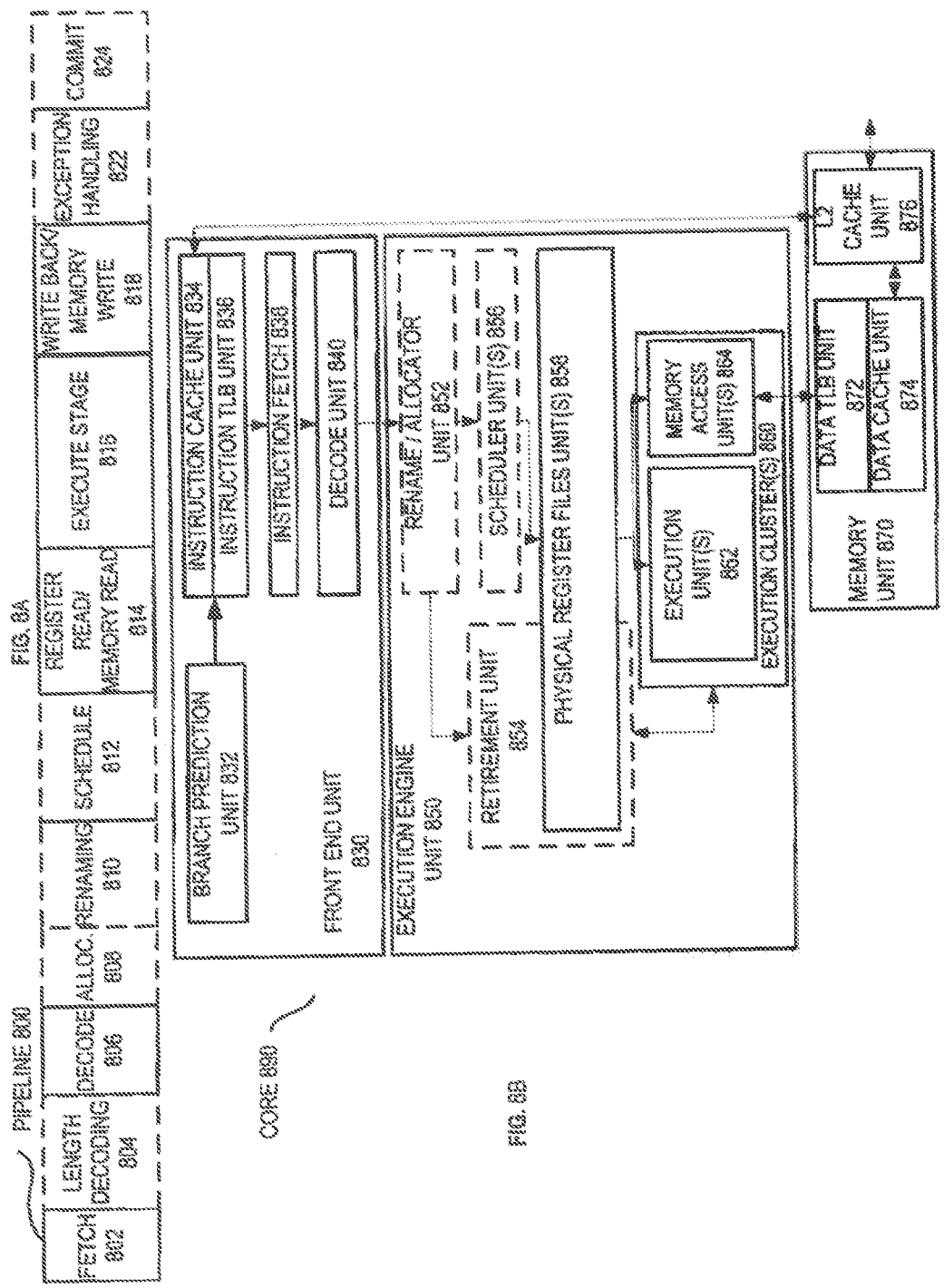

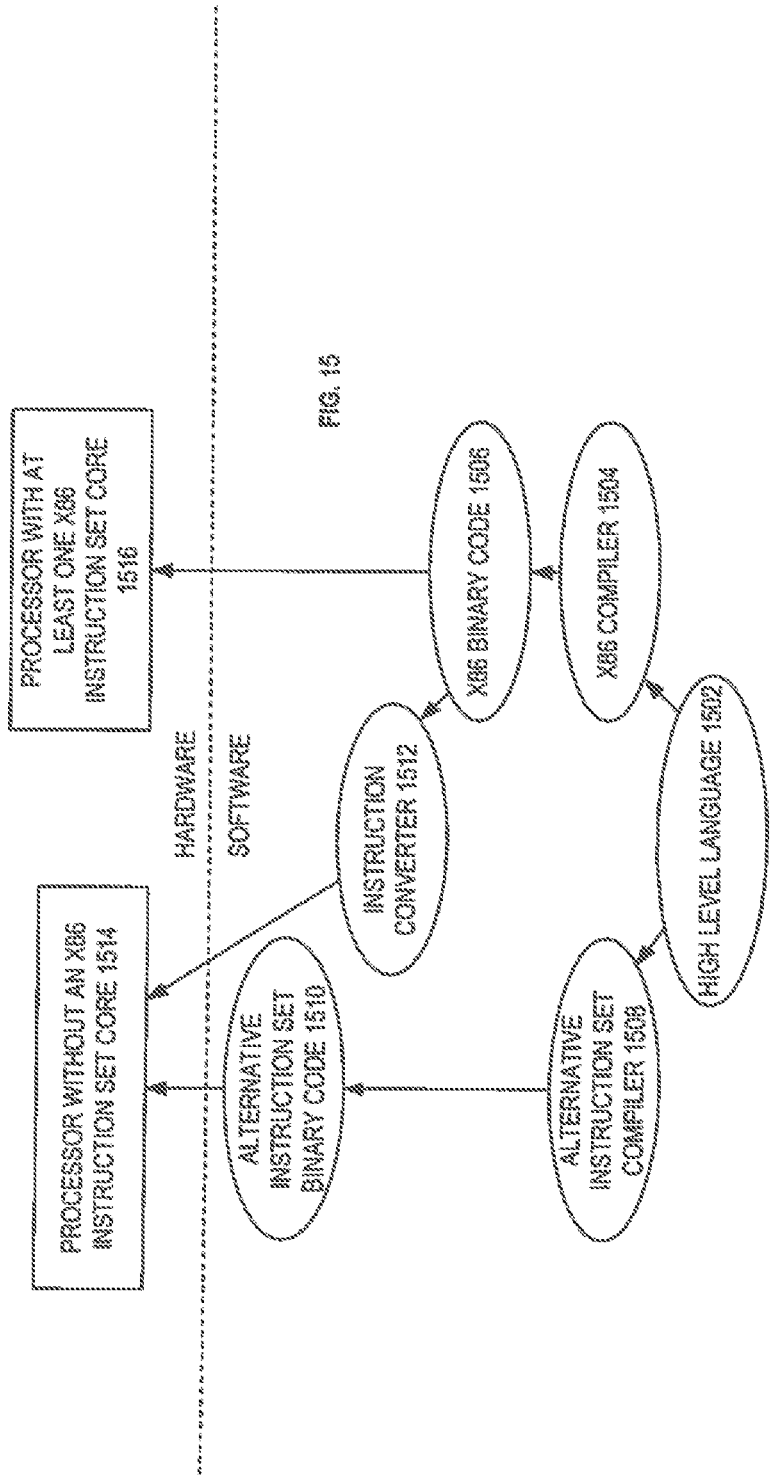

HARDWARE APPARATUSES AND METHODS TO CONTROL CACHE LINE COHERENCY

This invention was made with Government support under contract number H98230-11-3-0011 awarded by the Department of Defense. The Government has certain rights in this invention.

TECHNICAL FIELD

The disclosure relates generally to data requests, and, more specifically, to controlling cache line coherency.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., art instruction that is provided to the processor for execution, or to a micro-instruction, e.g., an instruction that results from a processor's decoder decoding macro-instructions. A processor, or set of processors, may each access data in the form of a cache line.

BRIEF DESCRIPTION OF THE DRAWINGS

The present disclosure is illustrated by way of example and not limitation in the figures of the accompanying drawings, in which like references indicate similar elements and in which:

FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

FIG. 15 is a block diagram contrasting the use of a software instruction converter to convert binary instructions in a source instruction set to binary instructions in a target instruction set according to embodiments of the disclosure.

DETAILED DESCRIPTION

Figure 1:
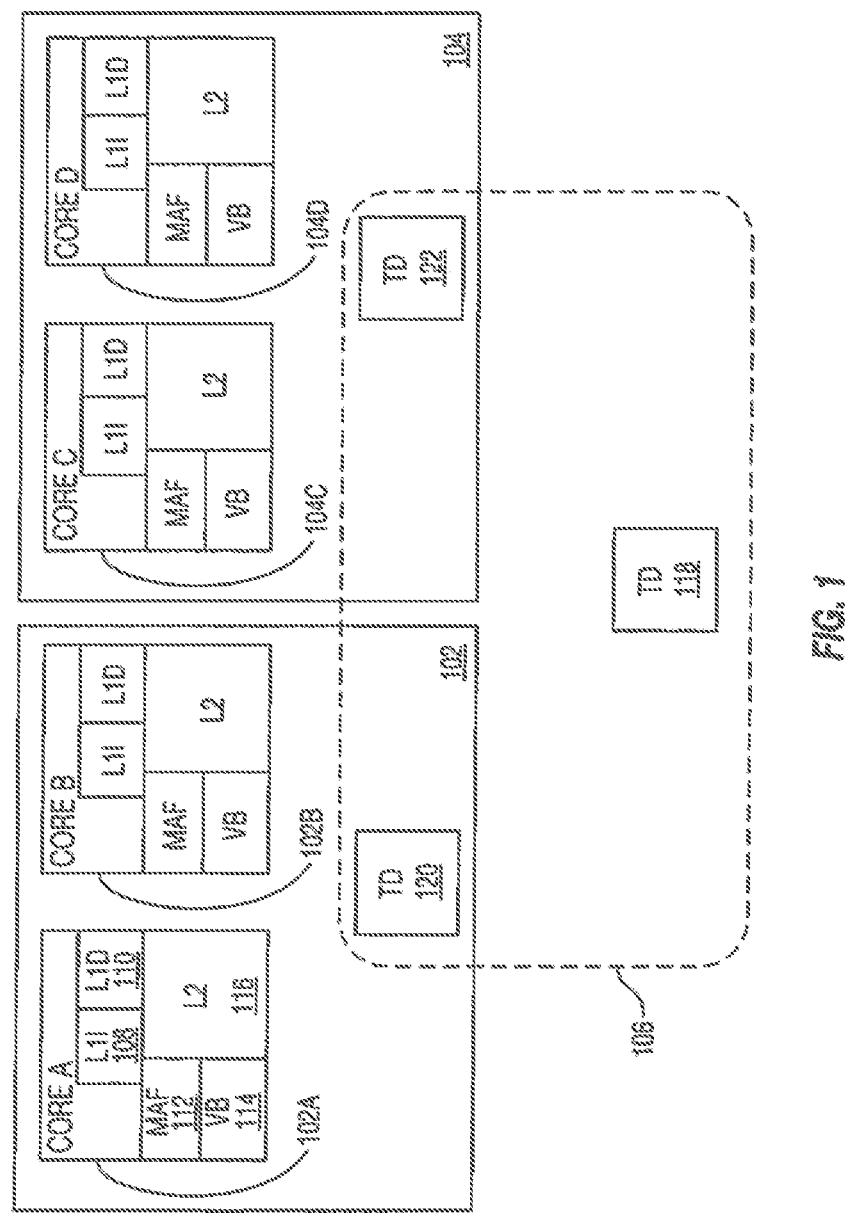
FIG. 1 illustrates an embodiment of multiple processors and tag directories in a cache coherency hierarchy.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor may operate on a cache line, e.g., in performing arithmetic or logic functions. A cache-line may generally refer to a block (e.g., a sector) of memory (e.g., a cache) that may be managed as a unit for coherence purposes, for example, cache tags may be maintained on a per-line basis, e.g., in a tag directory. A cache line may be stored in cache memory (e.g., of any level, such as, but not limited to, L3, L2, L3, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and the bus, for example, to store (e.g., hold) currently active copies of cache lines, (e.g., blocks from system (main) memory). Cache memory may be local to each processor. Additionally or alternatively, cache memory may be shared by multiple processors, e.g., separate from each processor. System memory may be separate from any cache memory, e.g., system memory that is off-die relative to a processor core. Cache line may refer to a 64 byte sized section of memory, e.g., 64 byte granularity. A tag directory entry may be different than the tag entries used in a cache. For example, a tag in the cache may describe the data (e.g., a cache line) at each cache entry. A tag directory may refer to a duplicate bookkeeping structure (e.g., occurring in the un-core) utilized by the cache line coherency logic (e.g., operations) to determine what data is in a cache without having to examine (e.g., access) the cache.

Cache line coherency may generally refer to each cache (e.g., cache memory) and/or system (e.g., main) memory in the coherence domain observing all modifications of that same cache line (e.g., that each instance of that cache line contains the same data). For example, a modification may be said to be observed by a cache when any subsequent read would return the newly (e.g., current) written value.

In one embodiment, cache line coherency logic (e.g., as part of a hardware apparatus or method) may be used to manage and/or resolve conflicts resulting from a number of transactions, for example, a cache line look-up, cache line eviction, cache line fill, and snoop transactions. A snoop may generally refer to the action taken by a module on a transaction when it is not the master that originated the transaction or the repository of last resort for the data, but it still monitors the transaction. A cache (e.g., cache memory) and/or system memory may be snooped to maintain coherence during transactions to a cache line appearing in multiple locations in the cache and/or system memory.

In one embodiment, a cache line look-up may involve read and/or read-for-ownership transactions from the processor cores accessing the cache and/or system memory to read or gain ownership of a desired cache line. If the cache line look-up results in a miss in the cache (e.g., cache local to a processor), the request may be allocated to the external request queue, e.g., corresponding to an interface with the system memory. If the cache line look-up results in a hit and the corresponding cache line is not exclusively owned by another core or processor, then the request may be completed and the cache line (e.g., data) returned to the requesting core. Accesses to a particular core from a requesting agent may be reduced by maintaining a tag (e.g., record) in a tag directory of whether another core has exclusive ownership, shared ownership, or no ownership of a requested line of the cache. The tag may be sets of hits in a tag directory (e.g., register) corresponding to the number of cores in a processor and/or processors, where each set of bits may indicate the type of ownership of the requested cache line, if any, for the core and/or processor to which it corresponds. However, the tag may be implemented in other ways without departing from the spirit of this disclosure.

A (e.g., centralized) tag directory may include entries to record the location and/or the status of respective cache lines as they exist throughout the system (e.g., in system memory, cache memory, or otherwise stored in a core and/or processor). For example, the tag directory may include an entry or entries to record which memory locations (e.g., processor caches) have a copy of the cache line (e.g., data), and may further record if any of the memory locations have an updated copy of the cache line (e.g., data).

For example, when a processor (e.g., core of a processor) makes a request to the main memory for a cache line (e.g., data), the tag directory may be consulted to determine where the most recent copy of the cache line (e.g., data) resides. In one embodiment, based on this information the most recent copy of the cache line may be retrieved so that it may be provided to the requesting processor (e.g., the cache memory of the requesting processor). The tag directory may then be updated to reflect the new status for that cache line. In one embodiment, each cache line read by a processor may be accompanied by a tag directory update (e.g., a write). The tag directory based cache coherency scheme (e.g., logic) may include multiple tag directories, and the tag directories may be arranged in a hierarchy. For example, a hierarchical tag directory structure may include any number of levels. A tag directory may exist for each level of a cache, e.g., a tag directory one (TD1) for a first level of cache, a tag directory two (TD2) for a second level of cache, etc. A tag directory may exist for a grouping of processor cores, e.g., a first tag directory for a plurality (e.g., 8 to 16) cores forming a domain and a second tag directory for a plurality (e.g., 8 to 16) domains each having a plurality of (e.g., 8 to 16) cores.

In one embodiment, conflicting requests to the same cache line (e.g., in multiple memory locations) may be handled by stalling the conflicting request until the data is moved. Stalling requests may not be a scalable approach and may not allow large numbers of processors (e.g., 32 or more processors) to be handled efficiently by the cache line coherency (e.g., logic hardware).

FIG. 1 illustrates an embodiment of multiple processors and tag directories in a cache coherency hierarchy. Cache(s) may be organized in any fashion, for example, as a physically or logically centralized or distributed cache. In one embodiment, a cache may include a physical centralized cache with a similarly centralized tag directory, such as higher level cache. Additionally or alternatively, a tag directory may be physically and/or logically distributed in a physically distributed cache.

In an embodiment, a processor, such as the processors and/or cores illustrated in the Figures, or any other processor, may include one or more caches. FIG. 1 illustrates an embodiment of processors (102,104) with multiple cores (102A,102B; 104C,104D). A processor may include at least one core and at least one un-core (e.g., 106). In one embodiment, multiple cores (102A,102B; 104C,104D) may be a single processor. A core (e.g., 102A,1028,104C,104D) may include components of the processor to execute instructions. An un-core (e.g., 106) may include all logic not in a core. A core (e.g., 102A) may include components such as a level 1 instruction cache (L1I) 108 and a level 1 data cache (L1D) 110. A core may include components such as a missing address file (MAF) 112, victim buffer (VB) 114, and a level 2 cache (L2) 116. An un-core (e.g., 106) may include the tag directories, for example, TD 120, TD 122, and TD 118, the control logic for those tag directories (not shown), and/or the interconnect (not shown) to pass messages (e.g., commands) and data between the cores (e.g., the caches thereof), the system memory, and/or the tag directories. One or more processors, one or more cores, and/or one or more un-cores and their caches may be associated with a domain. In an embodiment illustrated in FIG. 1, a processor (102 or 104), and its cores, un-cores, and caches, may both be associated into a single domain. A tag directory (TD) 118 may represent data in caches in that single domain. For example, processors (102, 104), and their cores, un-cores, and caches, may each be associated into their own domain, e.g., two domains total. A respective tag directory (TD) (120,122) may represent cache lines (e.g., data) in caches in each domain of processor one 102 and processor two 104. e.g., a level 1 tag directory (TD3). A single tag directory (e.g., TD 118) may represent cache lines (e.g., data) in caches in multiple domains (e.g., of processor one 102 and processor two 104). For example, the tag directory (TD) structure may be a hierarchy, where TD 120 and TD 122 are on one level of the hierarchy and TD 118 is on the next level. Although two levels in a tag directory (TD) hierarchy have been illustrated in FIG. 1, other embodiments may include any number of levels in a TD hierarchy.

For example, if a request for a cache line misses the L1D cache 110, the request may check for the same cache line in the L2 cache 116. If the cache line is not in the L2 cache 116, then the request may continue to check the TD 120 to find out whether the cache line is located in one of the caches in the domain represented by the TD 120 (e.g., a cache controlled by the other cores in the same domain), for example, the caches of core B). Even if a copy of the cache line is found in a neighboring cache in the same domain, there may be other copies of the cache line in other domains (for example, domain of processor 104), which may be accounted for from a cache coherency perspective. Therefore, the request may need to continue to the TD 118, and check if any other domains also have a copy of the cache line. A tag directory or directories may be included as part of a cache line coherency hardware logic. Cache line coherency logic may include an on-die memory controller and/or off-die memory controller.

The hardware apparatuses and methods discussed herein may be implemented with any cache at any cache level and/or any processor or processor level (e.g., core).

Figure 2:
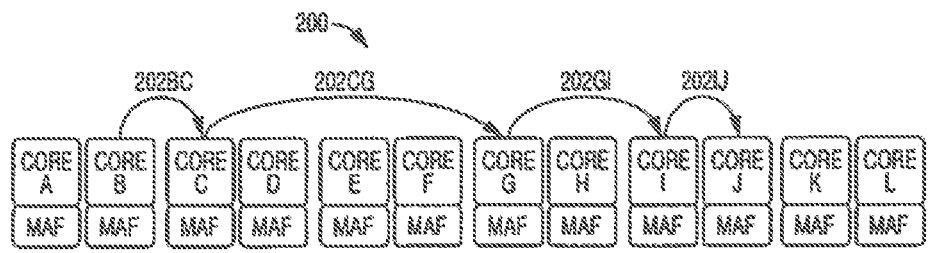
FIG. 2 illustrates an embodiment of an in-flight chain of cache line requests.

FIG. 2 illustrates an embodiment of an in-flight chain 100 of cache line requests. Although each depicted hardware processor core (A-L) includes a missing address file (MAF), a MAF is optional. A MAF may refer to a request inflight table, e.g., as part of the cache line coherency logic. A MAF for each processor core may be included. The processor cores (which may include other processors and/or cores) may communicate with each other, e.g., via the cache line coherency logic. In one embodiment, the cache line coherency logic may include a MAF for each core to provide a single point of ordering from the system interface perspective to allow for intra core communications and/or conflict resolution. In one embodiment, the MAF keeps track of state information required for coherence completion of transactions, snoops, and in-flight data from cache line requests.

In FIG. 2, an in-flight chain 100 of cache line requests is formed. Particularly, FIG. 2 illustrates several requests to the same cache line having been made by multiple hardware processor cores, e.g., with core B being the oldest (e.g., first) requestor. For example, core C has sent a request to core B for a cache line (for example, a fill request for core B to fill core C with a cache line, e.g., the data therein), core G then sent a request (e.g., a fill request) for the cache line (e.g., the same data) to core C, core I then sent a request (e.g., a fill request) to core G for the cache line (e.g., the same data), and core J then sent a request (e.g., a fill request) to core J for the cache line (e.g., the same data). FIG. 2 illustrates an eventual fill response 202BC to send the cache line from core B to core C (e.g., when core B has the cache line and is ready to forward the cache line to core C), then an eventual fill response 202CG to send the cache line from core C to core G (e.g., when core C has the cache line and is ready to forward the cache line to core G), then an eventual fill response 202GI to send the cache line from core G to core I (e.g., when core G has the cache line and is ready to forward the cache line to core I), and then an eventual fill response 202IJ to send the cache line from core I to core J (e.g., when core I has the cache line and is ready to forward the cache line to core J). In one embodiment, requestor core C has sent a request to a corresponding tag directory (not shown) for a cache line and the tag directory has indicated core B is the last accessor of the cache line so a forwarded request for the cache line (e.g., data) is sent to core B. When the forwarded request arrives at core B, it may determine (e.g., via cache line coherency logic) that core B has an outstanding request for the cache line (e.g., data), for example, a MAF entry is live for the cache line, and that request was ordered by the tag directory before the cache line request from core C. Line 202BC may represents the (e.g., eventual or future) fill response that is to be sent from core B to core C, e.g., when core B has the cache line (e.g., data) and is ready to forward it to core C. The target core (e.g., requestor core C) may be known (e.g., by the cache line coherency logic) because a field in the MAF of core B may indicate to send the cache line (e.g., data) to core C when ready. The cache line transmitted to a second processor from a first processor may be different than the cache line inputted into the first processor, e.g., from an arithmetic or a logic function. Cache line requests and/or (e.g., future) fill requests may be stored, e.g., in a MAF or other portion of cache line coherency logic. Cache line requests (e.g., probes) may be stored in a sending processor (e.g., core) and/or requesting processor (e.g., core), for example, in a MAF associated with each respective processor (e.g., core) or in a MAF of a sending or a receiving processor (e.g., core). In one embodiment, the in-flight chain 100 may continue to evaporate (e.g., be satisfied) as the fills are sent until eventually the last core to make a request to the line gets a fill (e.g., core J in FIG. 2) and that in-flight chain may be gone. For example, at the end of the resolution of the in-flight chain 200 in FIG. 2, copies of the cache line may be located at each core, e.g., the caches of cores B, C, G, I and J.

The arrows depicted in the Figures may refer to hardware logic or methods to move a cache line (e.g., data) or perform other operations, for example, hardware logic to perform those operations and/or instructions to cause those operations to be performed.

However, in certain embodiments, e.g., requests to the same cache line having been made by multiple hardware processor cores, an in-flight chain formed by a cache line coherency logic may block other (e.g., later) requests to access the same line. In one embodiment, a cache line coherency logic may block access to a cache line (e.g., data) when the cache line (e.g., data) is being moved from one location to another, for example, a cache line being moved from one cache (e.g., local to a first core or processor) to another cache (e.g., local to a first core or processor) or a cache line being moved from one cache to system memory. In certain embodiments, e.g., discussed below, cache line coherency hardware logic and methods do not block progress (e.g., access) of a request for a cache line that is being moved. In one embodiment, cache line coherency hardware logic and methods create a chain home (e.g., a (temporary) promise to fill a request) to deliver the cache line (e.g., data) to a conflicting requestor when the data arrives, for example, at the chain home or at the new location of the cache line. This may allow the conflicting request to the cache line to be processed (e.g., executed) and moved out of the way of subsequent requests instead of being blocked.

Two examples of operations that perform a cache line move are a victim operation and a back-invalidate operation, e.g., as discussed below. However the disclosure herein may be utilized with any operation, etc.

Figure 3:
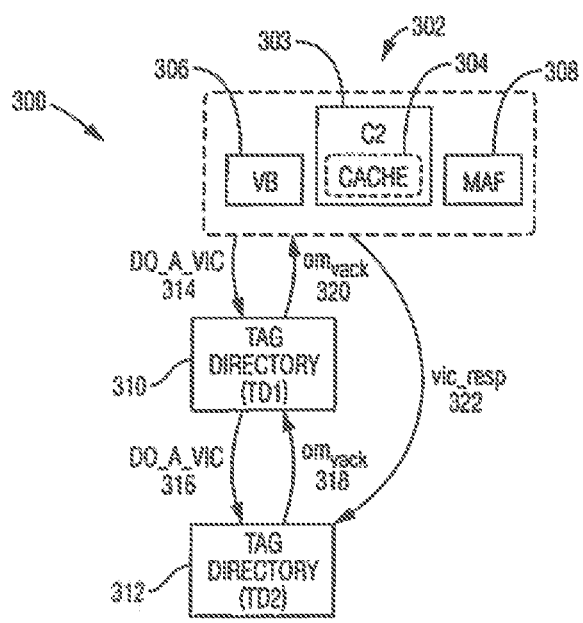
FIG. 3 illustrates an embodiment of a victim operation.

FIG. 3 illustrates an embodiment of a victim operation 300. Dotted box 302 may be a single processor or a portion (e.g., a core) of a processor. Depicted core 2 (C2) 303 includes a cache 304 (which may be part of the core or un-core). Core 303 (e.g., cache 304) may be part of a cache line coherency domain, e.g., managed by cache line coherency logic. Depicted core 2 includes a victim buffer (VB) 306 and a missing address file (MAF) 308, although each of those is optional. FIG. 3 further depicts a first tag directory (TD1) 310 and a second tag directory (TD2) 312, e.g., both as part of cache line coherency logic. A tag directory, for example, as discussed herein, may include entries corresponding to a cache line.

The depicted operations (e.g., messages) in FIG. 3 may be part of a cache line coherency logic (e.g., operations controlled or caused by the cache line coherency logic) and any other desired hardware. When a victim operation (e.g., to evict (remove) a cache line (data) from a cache and/or system memory) is desired, a request may be sent to a cache (e.g., a cache local to a processor). A request to perform a victim (eviction) operation may be sent via memory management logic, e.g., cache line coherency logic. Cache line data may be evicted from the cache, for example, to make room for a new (e.g., different) cache line. In one embodiment, when a block is evicted. It may be written into system memory. In one embodiment, when a block is evicted, it may not be written into system memory, e.g., the cache line may be deleted from the cache and/or system memory. In some embodiments, a cache line coherency scheme (e.g., protocol) includes a system to keep track of the cache lines (e.g., data) in the cache with a tag directory structure noting the blocks in cache and their current states.

The depicted logic operations include sending (e.g., via cache line coherency logic) victim request messages "DO_A_VIC" (314,316) that informs the cache line coherency logic (e.g., hierarchy) that the core (e.g., cache 304) wishes to not have a copy of the cache line anymore. Although the victim request messages DO_A_VIC (314, 316) are depicted as flowing in series to each of the respective tag directories (TD1 310, TD2 312), the messages may flow in parallel (e.g., concurrently) to each tag directory, for example, victim request message 316 may not flow through TD1 310. Although multiple tag directories are depicted, a single tag directory or any number of tag directories may be utilized. A victim request message may be sent from a processor (e.g., core 303), cache line coherency logic module, or any other component. The depicted logic operations include sending (e.g., via cache line coherency logic) order-marker victim acknowledge messages "$om_{vack}$" (318,320) that indicates that a victim request message (e.g., DO_A_VIC (314,316)) request has been received (e.g., acknowledged) by a tag directory and/or whether the cache line (e.g., data) should be moved from a core (e.g., core 2 (303)) to a system memory (e.g., external from the core). Order-marker victim acknowledge message(s) "$cm_{vack}$" (318,320) may return to a processor (e.g., core 303), cache line coherency logic module, or any other component, for example, that which sent the victim request message. Although the order-marker victim acknowledge messages "$om_{vack}$" (318,320) are depicted as flowing in series between each of the respective tag directories (TD1 310, TD2 312), the messages may flow in parallel (e.g., concurrently) from each tag directory, for example, order-marker victim acknowledge message 318 may not flow through TD1 310. In one embodiment, if requests for a cache line from a processor (e.g., cache 304 of core 303) are occurring in parallel (e.g., concurrently), then a request for the cache line (e.g., a probe message) may be sent to core 2 (303) and the data may delivered from the victim buffer (VB) 306 that is temporarily holding the cache line (e.g., data). For example, a processor (e.g., each core) may include a victim buffer (VB) as a structure to holds data evicted from the cache until it can be moved away (e.g., until the victim operation is complete). In one embodiment, for example, when all and/or the final order-marker victim acknowledge message (e.g., 320) is received, a victim response message "vic_resp" 322 may be sent from a processor (e.g., core 303), cache line coherency logic module, or any other component to a tag directory, e.g., TD1 (310) and/or TD2 (312). Victim response message 322 may include the cache line (e.g., the data). Victim response message 322 may include (e.g., a copy of or the address corresponding to) the cache line (e.g., the data) to update the other instances of the cache line, e.g., via the tag directory or directories. A victim response message may be sent to each tag directory, e.g., vic_resp going to each of TD1 (310) and TD2 (312). A victim response message may be sent to the "last" level of tag directory, e.g., TD2 (312) in FIG. 3.

In certain embodiments, multiple requests (e.g., to a cache of a core) to the same cache line may occur while a victim operation is occurring on the cache line (e.g., in the cache of the core). Requests may be stored as a MAF entry. In one embodiment, during the initial stages of the victim operation a request (e.g., a probe) for the cache line. In a processor core (e.g., in the cache thereof) may be sent from a requesting core (e.g., the cache thereof) to the core (e.g., the cache thereof) containing the cache line (e.g., data) and may be filled by the victim buffer, for example, if one is used or the cache line data has not been flushed (deleted) from the victim buffer. In certain embodiments, for example, when the victim buffer still contains the cache line (e.g., data), the cache line (e.g., data) may be sent to the requestor (e.g., requesting core) from the victim buffer, in another embodiment, e.g., if the victim buffer does not contain the cache line (e.g., data), requests (e.g., by a requesting core) for that cache line (e.g., data) from the sending core (e.g., the cache of the core associated with the victim buffer) may be stalled (e.g., blocked from progressing). The request for that cache line (e.g., data) may be stalled (e.g., blocked from progressing) at the tag directory until the line has been successfully removed (e.g., victimized) from the core (e.g., 303) and the tag directory entry or entries for that cache line (e.g., data) updated to reflect the new location (e.g., in system memory or another cache) of the data. In some embodiments, stalling requests may not be a scalable solution, for example, for a large numbers of cores (e.g., 32 or more cores).

In one embodiment, instead of blocking progress on all other requests to a cache line that is being moved (e.g., victimized) from the (e.g., cache of the) core to the system memory and/or another cache, cache line coherency logic and methods may utilize (e.g., create) a chain home (for example, a fill request, e.g., a temporary promise) to deliver the cache line (e.g., data) to a conflicting requestor when the data arrives, e.g., at the memory and/or a tag directory. This may allow the conflicting request (e.g., from a requesting core) to be processed, for example, to remove the conflicting request out of the way of subsequent requests.

Figure 4:
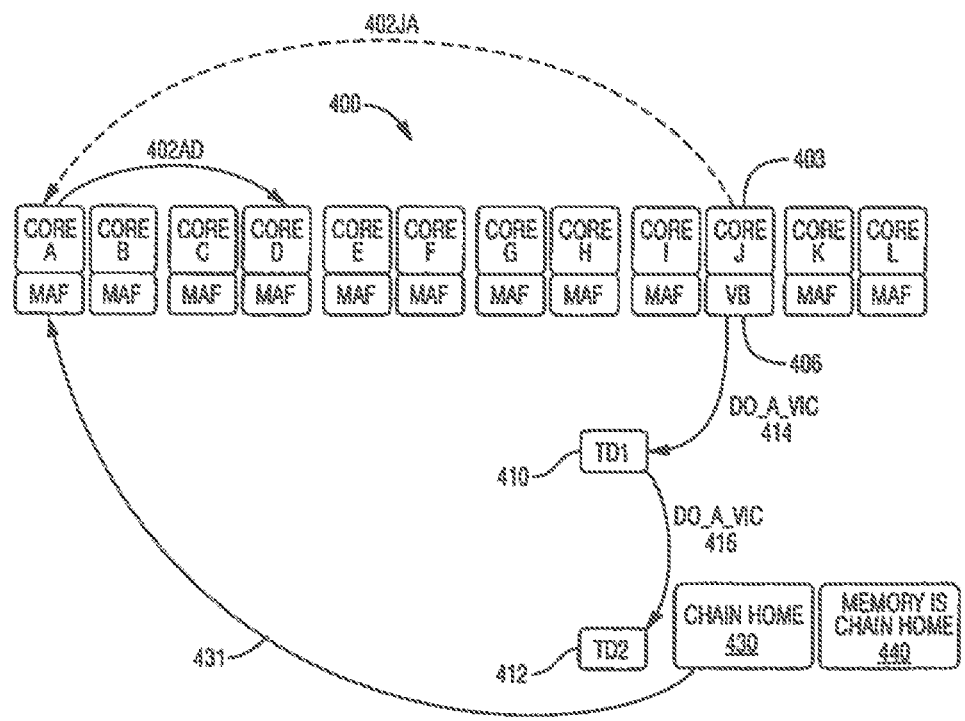
FIG. 4 illustrates an embodiment of a victim operation with a chain home.

FIG. 4 illustrates an embodiment of a victim operation with a chain home 400. Cores A-L are depicted as belonging to cache line coherency domain, e.g., managed by cache line coherency logic which includes a first tag directory (TD1) 410 and a second tag directory (TD2) 412. Depicted hardware processor cores A-I and K-L include a missing address file (MAF) (e.g., a table storing entries for missing addresses) although not required. Each hardware core may include a MAF and/or a victim buffer (VB). Depicted core J (403) includes a victim buffer (VB) 406 and may include a missing address file (MAF), although each of those is optional. Core(s) may each include a cache, e.g., a first level (L1) cache associated only with a single core.

FIG. 4 further illustrates several requests to the same cache line having been made by multiple hardware processor cores, e.g., with core J being the oldest (e.g., first) requestor. Particularly, core A has sent a request to core J for a cache line (for example, a fill request for core J to fill core A with a cache line, e.g., the data therein), and core D then sent a request (e.g., a fill request) for the cache line (e.g., the same data) to core A. FIG. 4 illustrates a possible fill response 402JA to send the cache line from core J to core A (e.g., when core J has the cache line and is ready to forward the cache line to core A), and then an eventual fill response 402AD to send the cache line from core A to core D (e.g., when core A has the cache line and is ready to forward the cache line to core D). Note that the cache line transmitted to a second processor front a first processor may be different that the cache line inputted into the first processor, e.g., from an arithmetic or a logic function.

Bit response 402JA is shown as a dotted line, as the depicted cache line coherency logic replaces fill response 402JA. Particularly, cache line coherency logic and methods may create a chain home 430 (e.g., as an entry a tag directory) in response to a request and/or a fill response. A chain home (e.g., chain home entry) may be created as a tag directory entry, e.g., depicted as an entry in a level two tag directory (TD2) 412. In one embodiment, a chain home allows for requests to the cache line (e.g., data) during the victim operation (e.g., when the cache line (data) is not in the VB 406) to form an in-flight chain (e.g., depicted as arrow 431) that connects through the chain home entry (e.g., in TD2 412) instead of connecting directly through the source core 403 (e.g., the cache thereof) as illustrated in FIG. 4.

In FIG. 4, depicted logic operations include sending (e.g., via cache line coherency logic) victim request messages "DO_A_VIC" (414,416) that informs the cache line coherency logic (e.g., hierarchy) that the core J 403 (e.g., cache thereof) wishes to not have a copy of the cache line anymore. Although the victim request messages DO_A_VIC (414, 416) are depicted as flowing in series to each of the respective tag directories (TD1 410, TD2 412), the messages may flow in parallel (e.g., concurrently) to each tag directory, for example, victim request message 416 may not flow through TD1 410. Although multiple tag directories are depicted, a single tag directory or any number of tag directories may be utilized. A victim request message may be sent from a processor (e.g., core J), cache line coherency logic module, or any other component.

In response to any desired operation (e.g., a victim request operation or a message corresponding to that victim request), a chain home 430 stay be formed, and the data from the source core (core J 403) may be sent to the chain home (or an address corresponding to the data). Although not depicted, order-marker victim acknowledge message(s) "om$_{vack}$" and/or victim response message "vic_resp" may also be utilized, e.g., by cache line coherency logic. In one embodiment, for example, when all and/or the final order-marker victim acknowledge message is received, a victim response message "vic_resp" may be sent from a processor (e.g., core J 403), cache line coherency logic module, or any other component to a tag directory, e.g., TD1 (410) and/or TD2 (412). Victim response message may include the cache line (e.g., the data). Victim response message may include (e.g., a copy of or the address corresponding to) the cache line (e.g., the data) to update the other instances of the cache line, e.g., via the tag directory or directories. In one embodiment, the requested cache line (e.g., data) is sent to a tag directory to form a chain home when cache line coherency logic detects a request for a cache line (e.g., data) by a requesting processor and/or core (e.g., a cache thereof) (e.g., core A in FIG. 4) from a source processor and/or core (e.g., a cache thereof) (e.g., core J 403 in FIG. 4) and detects an operation (e.g., a victim operation in FIG. 4) is occurring or is to occur at the source processor and/or core (e.g., a move of the cache line (data) front the cache of the source processor to a system memory). Additionally to the "chain home" 430 field, a "Memory is chain home" 440 field may be included, e.g., as part of the chain home 430 field. For example, memory is chain home 440 may be set (for example, a flag set high or low, e.g., a high or low bit) when the cache line (e.g., data) is moved into a system memory or other memory.

A chain home may be formed in any or all levels of a tag directory. A chain home may be formed in a single tag directory (e.g., TD1 430), for example, when a single tag directory is used, e.g., where there is no second level (e.g., TD2 412) or greater tag directory. A chain home may be formed by cache line coherency logic forming the chain home entry, e.g., as a section of bits. A chain home may be formed (e.g., by the writing of data) in the final level of a tag directory, e.g., TD2 412 in FIG. 4. In one embodiment, cache line coherency logic may detect a request for a cache line (e.g., data) by a requesting processor and/or core (e.g., a cache thereof) from a source processor and/or core (e.g., a cache thereof) and may detect if an operation is occurring or is to occur at the source processor and/or core (e.g., a move of the cache line (data) from the cache of the source processor to a system memory). In certain embodiments, in response to the detection of the foregoing request and operation, the cache line coherency logic may replace the request from the source processor and/or core (e.g., core J 403) with a chain home in a tag directory to cause the cache line (data) to be sent (e.g., from the tag directory instead of directly from the source processor and/or core) to the requesting processor and/or core (e.g., a cache thereof).

Communications (e.g., via cache line coherency logic) between the processors and/or cores (e.g., cachets) thereof) and/or cache line request(s) may be accomplished via any means in the art.

In certain embodiments, a chain home may allow a cache line (e.g., data) to be moved (e.g., from a core to memory) without blocking other requests to access the same cache line. For example, instead of blocking progress on all other requests (e.g., by other cores) to a cache line that is being victimized (e.g., evicted), for example, from the source core to the system memory or other memory. Chain home may include a fill request (e.g., a temporary promise) to deliver the data to a conflicting requestor when the data arrives, e.g., at the tag directory and/or system memory or other memory. Thus, certain embodiments may allow the conflicting request for the cache line to be processed and moved out of the way of subsequent requests for the cache line.

Figure 6:
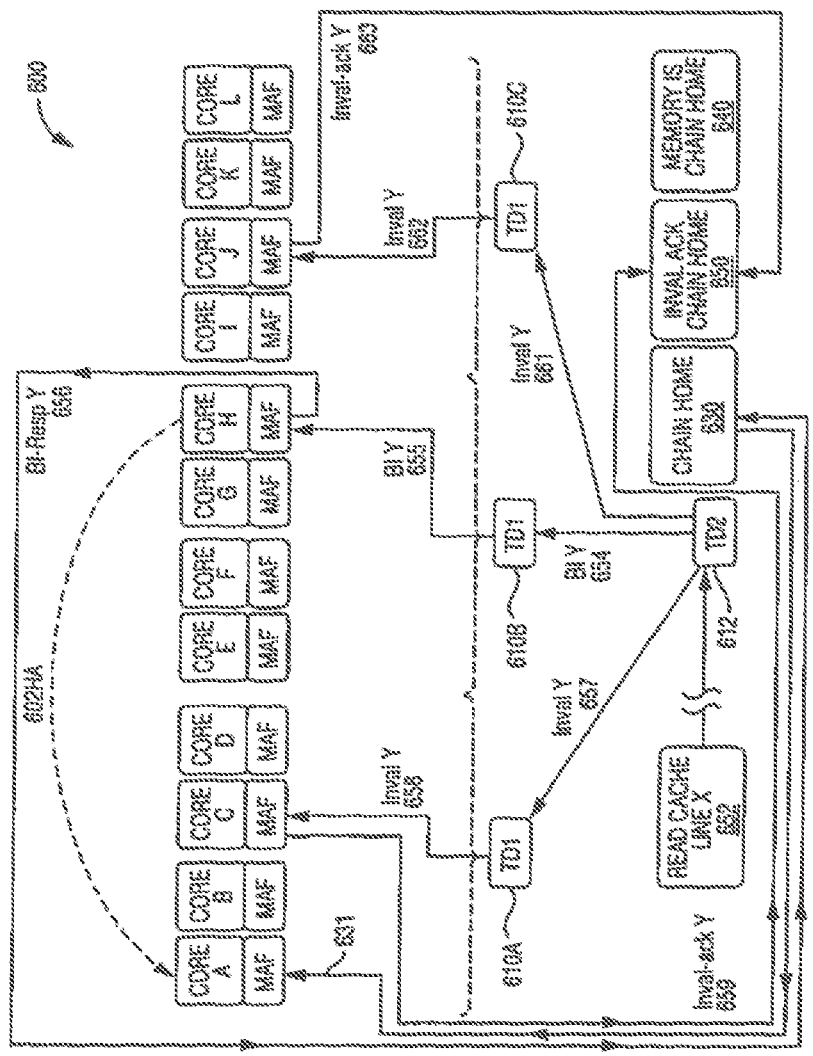
FIG. 6 illustrates an embodiment of a back-invalidate operation with a chain home.

In one embodiment, the cache line (e.g., data) is part of a cache coherent memory domain and all accesses to the data are controlled by a cache line coherency protocol, e.g., of cache line coherency hardware logic. The cache line (e.g., data) may be located by accessing a tag directory that specifies where the cache line (e.g., data) may be found in the cache hierarchy. For example, the tag directory processing may be handled in a non-blocking pipelined fashion. In one embodiment, requests that reference a specific cache line arrive at the tag directory and the cache line coherency logic (e.g., via processing) may change the tag directory entry of that cache line to indicate where the cache line (e.g., data) will be after the operations initiated by the request (e.g., a victim operation) are completed. Processing of a subsequent request that reference (e.g., to access) that same cache line may use the updated tag directory entry to determine which messages are needed and/or to make a change to the tag directory entry indicating the location of the cache line (e.g., data) upon completion of the subsequent request. In this manner, messages and/or operations from multiple requests can be in-flight at the same time. A tag-directory may be organized in a hierarchical fashion, with the first level of a tag directory forming a domain that describes the cache lines stored in the caches of a first number of cores (e.g., 8 to 16 cores) and a second level of tag directory that describes the cache lines stored in the caches of a second number of domains (e.g., 8 to 16 domains, each having 8 to 16 cores). A hierarchical tag structure may continue for more levels, but the examples in FIGS. 3, 4, and 6 are for two levels of a tag directory.

In one embodiment, e.g., by use of the last-accessing core field in a tag directory entry, the processing of multiple read (e.g., read for ownership (RFO)) requests to the same cache line may form an in-flight chain of MAF entries each specifying the next target (e.g., core) for a fill of the cache line (e.g., data). An an in-flight chain is illustrated in FIGS. 2, 4, and 6.

Figure 5:
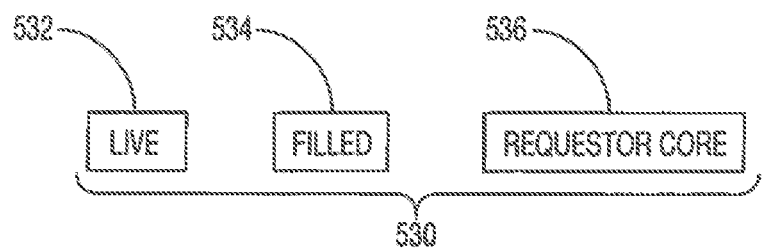
FIG. 5 illustrates an embodiment of a chain home entry.

FIG. 5 iterates an embodiment of a chain home 530 entry. The depicted chain home contains a live field 532, a filled field 534, and a requestor core (e.g., identification) field 536. A chain home entry may include any or all of these fields and/or any other desired fields. The live field 532 (e.g. flag) being set (e.g., high or low) may indicate that an operation that might block a request for the cache line has started, for example, that a DO_A_VIC operators has started (e.g., is received at TD2 412) and created a chain home. A filled field 534 (e.g., a flag) being set (e.g., high or low) may indicate that a subsequent request to the same cache line has occurred while the operation that might block a request for the cache line has started (e.g., a victim operation is its progress). A requestor core 536 field (e.g., a bit or series of bits) being set may indicate that a specific core (e.g., core A) has issued a request for the cache line while the operation that might block a request for the cache line is in progress (e.g., a victim process is in light). In one embodiment, the chain home is created by the move message (e.g., a victim operation message or back-invalidate operation message) being processed at a tag directory, e.g., TD2. In one embodiment, this may include setting the live field (e.g., flag) 532 and clearing the filled field (e.g., flag) 534. In one embodiment, when the cache line (e.g., data) arrives at the tag directory (e.g., TD2 412 in FIG. 4), for example, as a payload in a vic_resp message received at the tag directory, and the logic determines that no parallel requests have occurred (e.g., the filled flag is still false) then the cache line (e.g., data) may be placed in system memory or other memory and the memory is chain home field (e.g., flag) (e.g., 440 in FIG. 4) may be set as well as clearing the live field (e.g., flag). In one embodiment, when a parallel (e.g., subsequent) request for the cache line of the operation that might block a request for the cache line is in progress (for example, when that cache line is being moved (e.g., victimized)), the request may be processed at the tag directory (e.g., TD2), for example, by the cache line coherency logic, and find the live field 532 of the chain home 530 is set. The cache line coherency logic may then load the identification of the requesting core into the requestor core field 536 and the filled field (e.g., flag) 534 may be set. Additionally or alternatively, a last accessor (e.g., the identity of the last accessing core) field (not shown) may be set to point to the requesting core. If a subsequent request for the cache line arrives (e.g., during the potentially blocking operation) it may check the last accessor field and update the last accessor field accordingly. This is one example of a cache line coherency hardware logic and methods building an in-flight chain to connect the chain home in a tag directory.

Although a single chain home is depicted in the Figures, multiple chain homes, e.g., each for different requesting cores, may be utilized.

FIG. 6 illustrates an embodiment of a back-invalidate operation with a chain home 600. As above, although cores A-L include a MAF, a MAF is optional. Further, a VB may be included and/or associated with each core. Depicted core A has sent a request 602HA to core H for a cache line (for example, a fill request for core H to fill core A with a cache line, e.g., the data therein. Request 602HA is shown as a dotted line, as the depicted cache line coherency logic replaces request 602HA. Particularly, cache line coherency logic and methods may create a chain home 630 (e.g., as an entry a tag directory) in response to a request (e.g., a fill request). A chain home (e.g., chain home entry) may be created as a tag directory entry, e.g., depicted as an entry in a level two tag directory (TD2) 612. In one embodiment, a chain home allows for requests to the cache line (e.g., data) during the back-invalidate operation (e.g., when the cache line (data) is not in a buffer of core H to form an in-flight chain (e.g., depicted as arrow 631) that connects through the chain home entry (e.g., in TD2 612) instead of connecting directly through the source core H (e.g., the cache thereof) as illustrated in FIG. 6.

As similarly discussed in reference to FIG. 4, when a parallel (e.g., subsequent) request for the cache line of the operation that might block a request for the cache line is in progress (for example, when that cache line is being moved (e.g., victimized)), the request may be processed at the tag directory (e.g., TD2 612) and a chain home may be formed, e.g., in a tag directory. In one embodiment, cache line coherency logic creates a chain home and/or an invalid acknowledgment (Inval_ack) chain home 650. The invalid acknowledgment (Inval_ack) chain home 650 may be part of the chain 630 field. In one embodiment, additionally to the "chain home" 630 field, a "Memory is chain home" 640 field may be included, e.g., as part of the chain home 630 field.

In the depicted embodiment, a back-invalidate operation may be requested, e.g., when a cache and/or tag directory has exceed a fill threshold and thus a cache line(s) (e.g., data) needs to be cleared to allow room for a new cache line(s) (e.g., data). A cache line eviction may require a back-invalidate operation to one or more memory locations (e.g., tag directory or cache or system memory or other storage of a core or processor) to coherently evict a cache line (e.g., from the tag directory and/or cache and/or system memory and/or other storage hierarchy).

In FIG. 6, the tag directory includes a second level tag directory (TD2) 612 that forms a domain that includes multiple (e.g., 3) first level tag directories (610A, 610B, 610C). Second level tag directory 612 may include entries for all of the cores A-L (e.g., the caches thereof). First level tag directories may each include entries for a subset of less than all of the cotes in the second level tag directory. First level tag directory (TD1) 610A may include entries for cores A-D (e.g., the caches thereof), first level tag directory (TD1) 610B may include entries for cores E-H (e.g., the caches thereof), and first level tag directory (TD1) 610C may include entries for cores I-L (e.g., the caches thereof).

In one embodiment, a request to access a cache line (e.g., read cache line X (652)) may arrive at a tag directory (e.g., TD2 612) and a corresponding tag directory entry is to be created, but the set of tag directory entries it could use is full, so the cache line coherency logic is to clear a tag directory entry to make room. The cache line coherency logic may then initiate a back-invalidate operation on the tag-directory entry for cache line Y. This may result in the cache line coherency logic sending a back-invalidate message (BI_Y) (654, 655) to the last_accessor of Y (e.g., core H here) and/or invalidate commands to all other copies of Y. Although depicted back-invalidate message (BI_Y) (654, 655) travels through a first level tag directory 610B, a back-invalidate message may be sent directly to a (e.g., last accessor) core (e.g., a cache thereof). Cache line coherency logic may create a chain home 630 (e.g., in response to the back-invalidate operation request). In one embodiment, a chain home is initiated for cache line Y in response to the receipt (e.g., by receiving core H) of the back-invalidate operation, for example, the receipt of back-invalidate message (BI_Y) 655. In one embodiment, a chain home is initiated for cache line Y in response to the receipt (for example, by a tag directory, e.g., TD2 612) of the back-invalidate operation, for example, the receipt of back-invalidate response message (BI-Resp Y) 656. The initiation of a back-invalidate operation may also cause invalidate messages (e.g., commands) to be sent to the other instances of cache line Y. For example, core C and core J (e.g., the respective caches thereof) in FIG. 6 include a copy of cache line (e.g., data) Y, e.g., as determined from a tag directory or directories. Cache line coherency protocol (e.g., logic) may include sending invalidate Y messages (e.g., commands) to a core (e.g., cache thereof) containing the cache line Y. For example, cache line coherency logic (e.g., TD2 612) may send an invalidate cache line Y message (657,658; 661,662), either directly or in series with TD1 (610A,610C; respectively) to a core that also includes a copy of cache line Y (e.g., the data). In one embodiment, a core (e.g., a cache thereof) receiving an invalidate cache line message (e.g., command) may send an acknowledgment message, e.g., Inval-ack Y (659,663), to the cache line coherency logic (e.g., TD2 612).

Note that a message (e.g., command) to invalidate a cache line may be sent directly to a core (e.g., a cache thereof) and not through a tag directory, e.g., TD1 (610A,610C) in FIG. 6.

In one embodiment, the last accessor of cache line Y (e.g., core H in FIG. 6) returns a back-invalidate response message (BI_Resp 656) that contains the cache line (e.g., data) and may check the chain home 630 to determine if any other core has accessed cache line Y in the interim and must be chained to it. For example, in one embodiment, when a back-invalidate (BI_Resp 656) message arrives with the cache line (e.g., data) that is to be back invalidated, the cache line coherency logic examines whether the chain home(s) 630 are filled and either places the data in (e.g., system) memory if a chain home is unfilled or sends a fill to a requestor core if a chain home is filled. The back-invalidate process may also invalidate copies of the cache line (e.g., data) and when the count of invalid acknowledgements (e.g., 659,663) matches the number (e.g., a comparator determines zero) of invalidating operations that is listed In the invalid acknowledgment chain home (Inval ack chain home 650). In one aspect, the cache line coherency logic populates the invalid acknowledgment chain home (Inval ack chain home 630) with the number of cache line invalidates determined from the tag directory or directories, e.g., excluding the last accessor core of the cache line. In one embodiment, the cache line coherency logic may send an invalidation complete message to the chain home 630, e.g., to indicate that the back-invalidate operation is complete and the chain home may be discarded (e.g., deleted).

In FIG. 6, during the back-invalidate operation, core A requested cache line Y (e.g., the data), for example, from core H. Cache line coherency logic may form a chain home 630 for core A. For example, by sending the cache line (e.g., data) from the chain home (e.g., from TD2) to core A. In one embodiment, the cache line (e.g., data) is the payload in a back invalidate response (BI_Resp Y 656) message received at the tag directory. In certain embodiments, the chaining of cache line (e.g., data) requests in a chain home and/or the chaining of back-invalidate acknowledgments (Inval ack chain home 650) may allow for the processing of these requests and/or acknowledgments to be done without blocking them, e.g., to provide scalability of the cache line coherency protocol.

Figure 7:
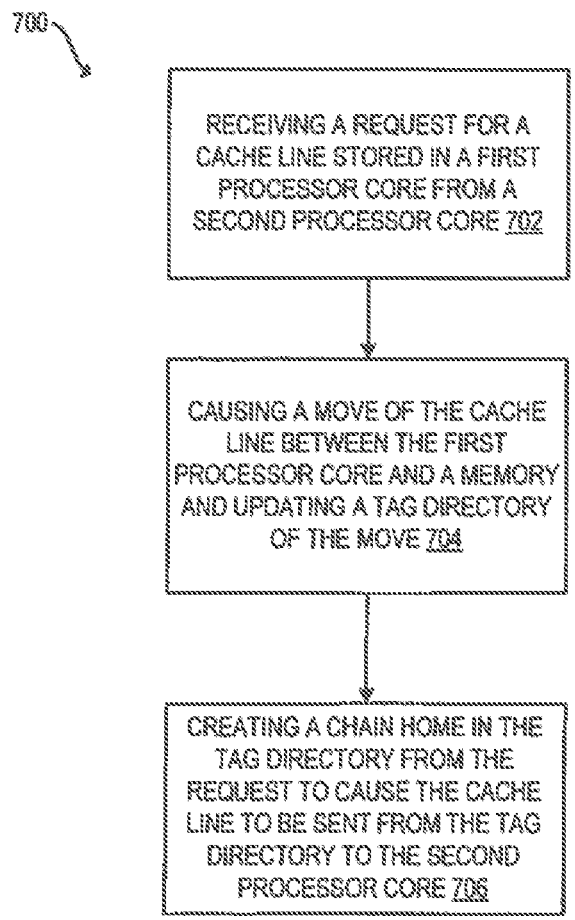
FIG. 7 illustrates a flow diagram of creating a chain home.

FIG. 7 illustrates a flow diagram of creating a chain home 700. Flow diagram includes receiving a request for a cache line stored in a first processor core from a second processor core 702, causing a move of the cache line between the first processor core and a memory and updating a tag directory of the move 704, and creating a chain home in the tag directory from the request to cause the cache line to be sent from the tag directory to the second processor core 706. In one embodiment, a chain home may be formed when (i) a request for a cache line (e.g., data) by a requesting processor and/or core (e.g., a cache thereof) from a source processor and/or core (e.g., a cache thereof) is detected and/or (ii) an operation is occurring or is to occur at the source processor and/or core (e.g., a move of the cache line (data) from the cache of the source processor to a system memory) on that cache line. In certain embodiments, in response to the detection of the foregoing request and operation, the cache line coherency logic may replace the request from the source processor and/or core (e.g., core J 403 in FIG. 4) with a chain home its a tag directory to cause the cache line (data) to be sent (e.g., from the tag directory instead of directly from the source processor and/or core) to the requesting processor and/or core (e.g., a cache thereof).

In one embodiment, a hardware apparatus includes a first processor core having a cache to store a cache line, a second processor core to send a request for the cache line from the first processor core, moving logic to cause a move of the cache line between the first processor core and a memory and to update a tag directory of the move, and cache line coherency logic to create a chain home in the tag directory from the request to cause the cache line to be sent from the tag directory to the second processor core. The move may include a victim operation to remove the cache line from the first processor core. The victim operation may remove the cache line from a victim buffer of the first processor core. The move may include a back-invalidate operation. The chain home may include an invalid acknowledgement field, a requestor core field, a live field to indicate that the move is in progress and/or the chain home is created in the tag directory, a filled field to indicate that the second processor core sent the request for the cache line from the first processor core, e.g., while the move is in progress, or any combinations thereof.

In another embodiment, a method to control cache line coherency includes receiving a request for a cache line stored In a first processor core from a second processor core, causing a move of the cache line between the first processor core and a memory and updating a tag directory of the move, and creating a chain home in the tag directory from the request to cause the cache line to be sent from the tag directory to the second processor core. The causing the move may include performing a victim operation to remove the cache line from the first processor core. The performing the victim operation may remove the cache line from a victim buffer of me first processor core. The causing the move may include performing a back-invalidate operation. The creating the chain home may include updating a requestor core field. The creating the chain home may include updating a live field to indicate that the move Is in progress and the chain home is created in the tag directory. The creating the chain home may include updating a filled field to indicate that the second processor core sent the request for the cache line from the first processor core, e.g., while the move is in progress.

In yet another embodiment, a hardware system includes a system memory, a first processor core having a cache to store a cache line, a second processor core to send a request for the cache line from the first processor core, moving logic to cause a move of the cache line between the first processor core and the system memory and to update a tag directory of the move, and cache line coherency logic to create a chain home in the tag directory from the request to cause the cache line to be sent from the tag directory to the second processor core. The move may include a victim operation to remove the cache line from the first processor core. The victim operation may remove the cache line from a victim buffer of the first processor core. The move may include a back-invalidate operation. The chain home may include an invalid acknowledgement field, a requestor core field, a live field to indicate that the move is in progress and/or the chain home is created in the tag directory, a filled field to indicate that the second processor core sent the request for the cache line from the first processor core, e.g., while the move is in progress, or any combinations thereof. In one embodiment, a victim operation is initialed (e.g., by cache line coherency logic) to free op an entry for a cache line in a processor (e.g., a cache thereof). In one embodiment, a back-invalidate operation is initiated (e.g., by cache line coherency logic) to free up an entry in a tag directory, for example, when the total entries in a tag directory have exceed a fill threshold and thus a cache line(s) needs to be cleared to allow room for a new cache line(s) in the tag directory.

In another embodiment, a hardware apparatus includes a first processor core having a cache to store a cache line, a second processor core to send a request for the cache line from the first processor core, means to cause a move of the cache line between the first processor core and a memory and to update a tag directory of the move, and/or means to create a chain home in the tag directory from the request to cause the cache line to be sent from the tag directory to the second processor core.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes site rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 858 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and it retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 850. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution clusters) 860 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 864). It should also be understood that where separate pipelines are used, one or mere of these pipelines may be out-of-order issue/execution and the rest in-order.

The set of memory access units 864 is coupled to the memory unit 870, which includes a data TLB unit 872 coupled to a data cache unit 874 coupled to a level 2 (12) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-threading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
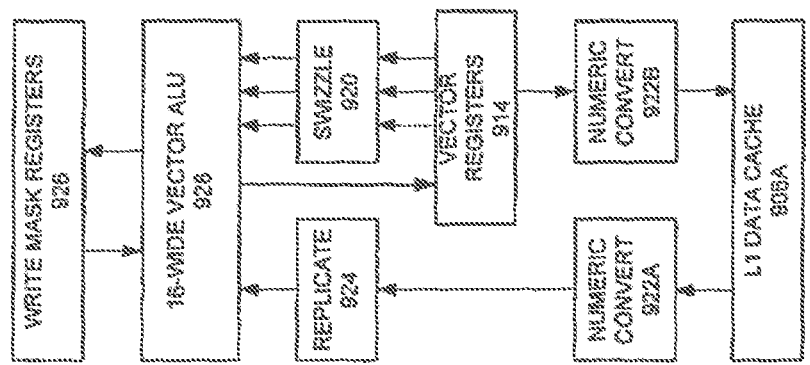
FIG. 9B is an expanded view of part of the processor core in FIG. 9A according to embodiments of the disclosure.
Figure 9A:
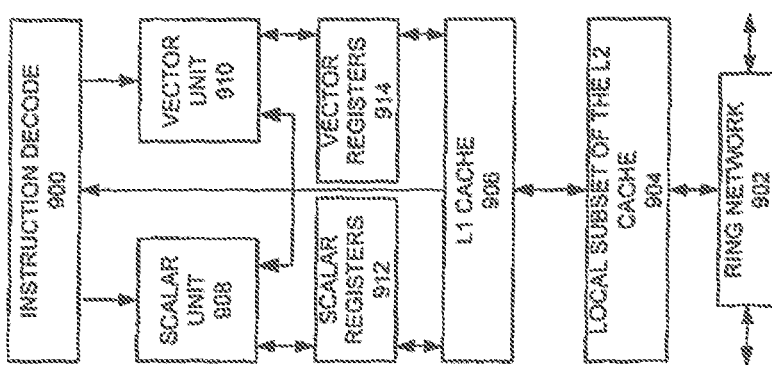
FIG. 9A is a block diagram of a single processor core, along with its connection to the on-die interconnect network and with its local subset of the Level 2 (L2) cache, according to embodiments of the disclosure.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decoder 900 supports the x86 instruction set wish a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach, (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stoned in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register Inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
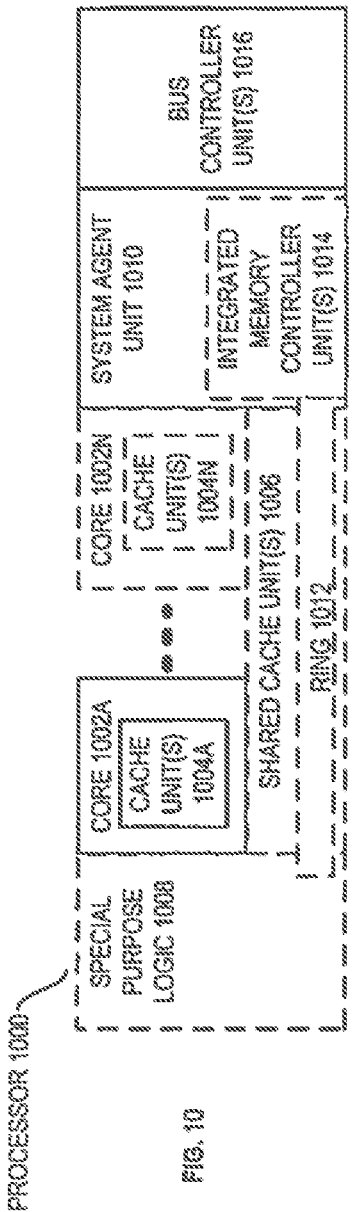
FIG. 10 is a block diagram of a processor that may have more than one core, may have an integrated memory controller, and may have integrated graphics according to embodiments of the disclosure.

FIG. 16 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may Include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-M being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N, e.g., by cache line coherency logic.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
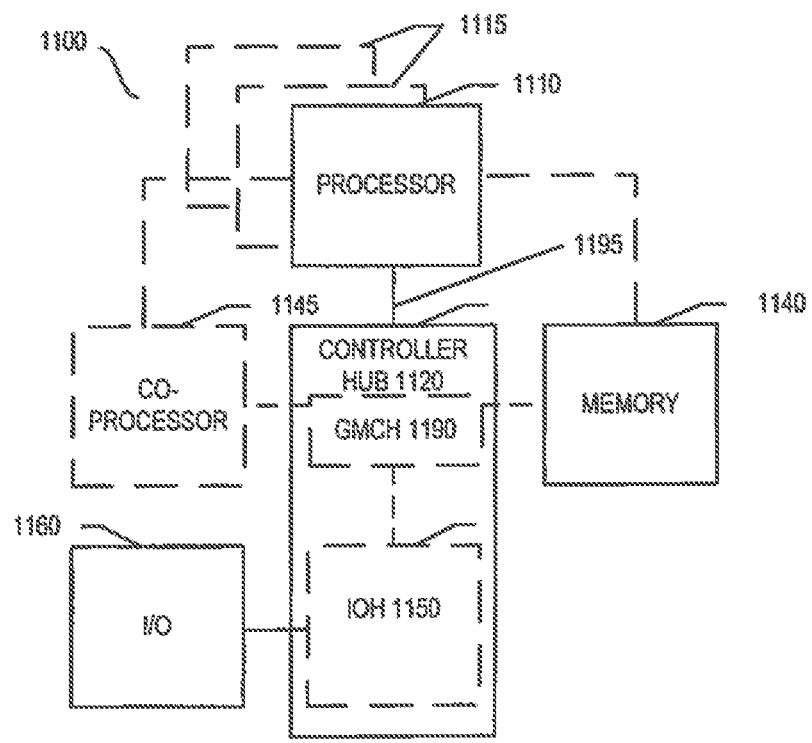
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processors) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
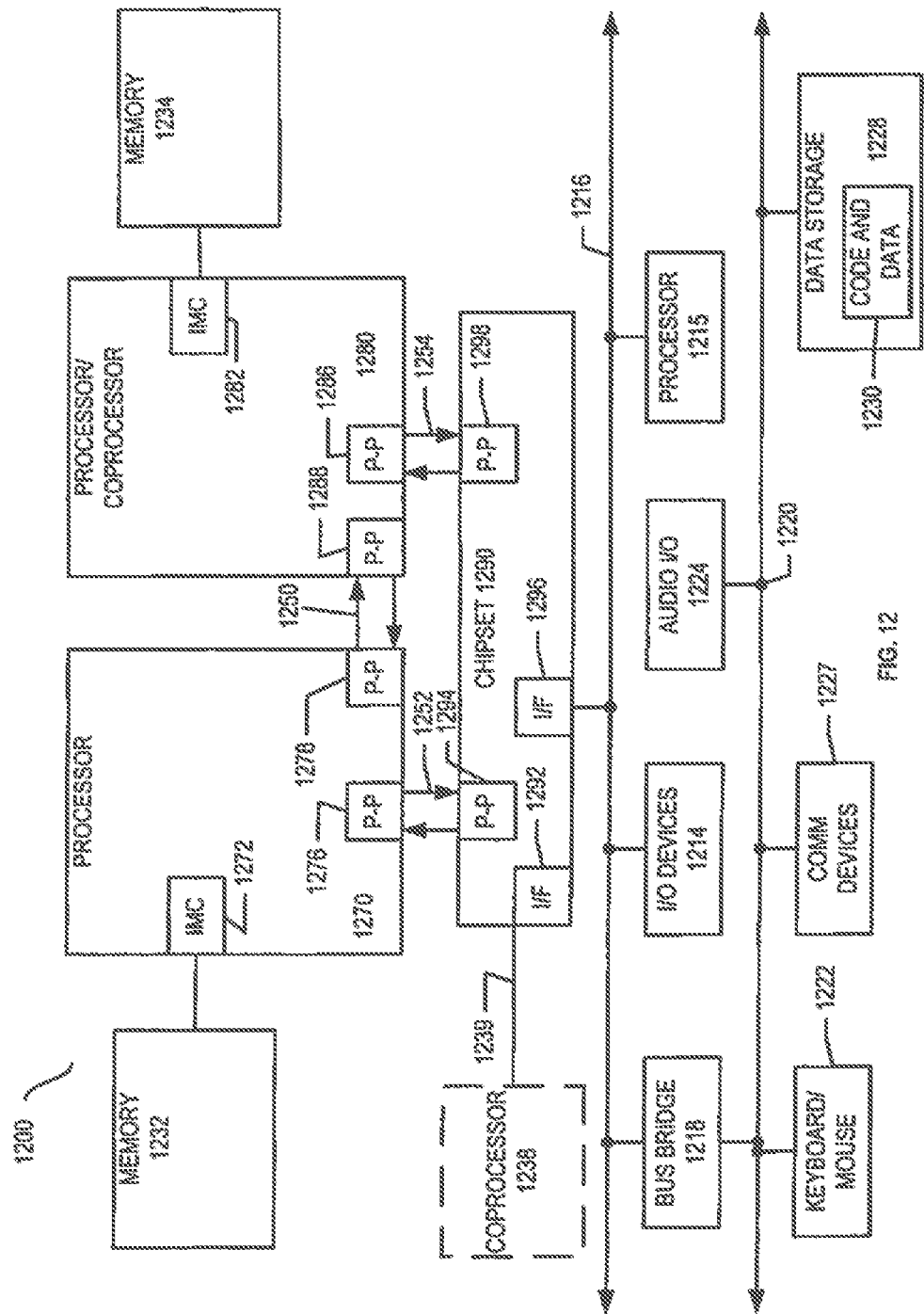
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression, engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
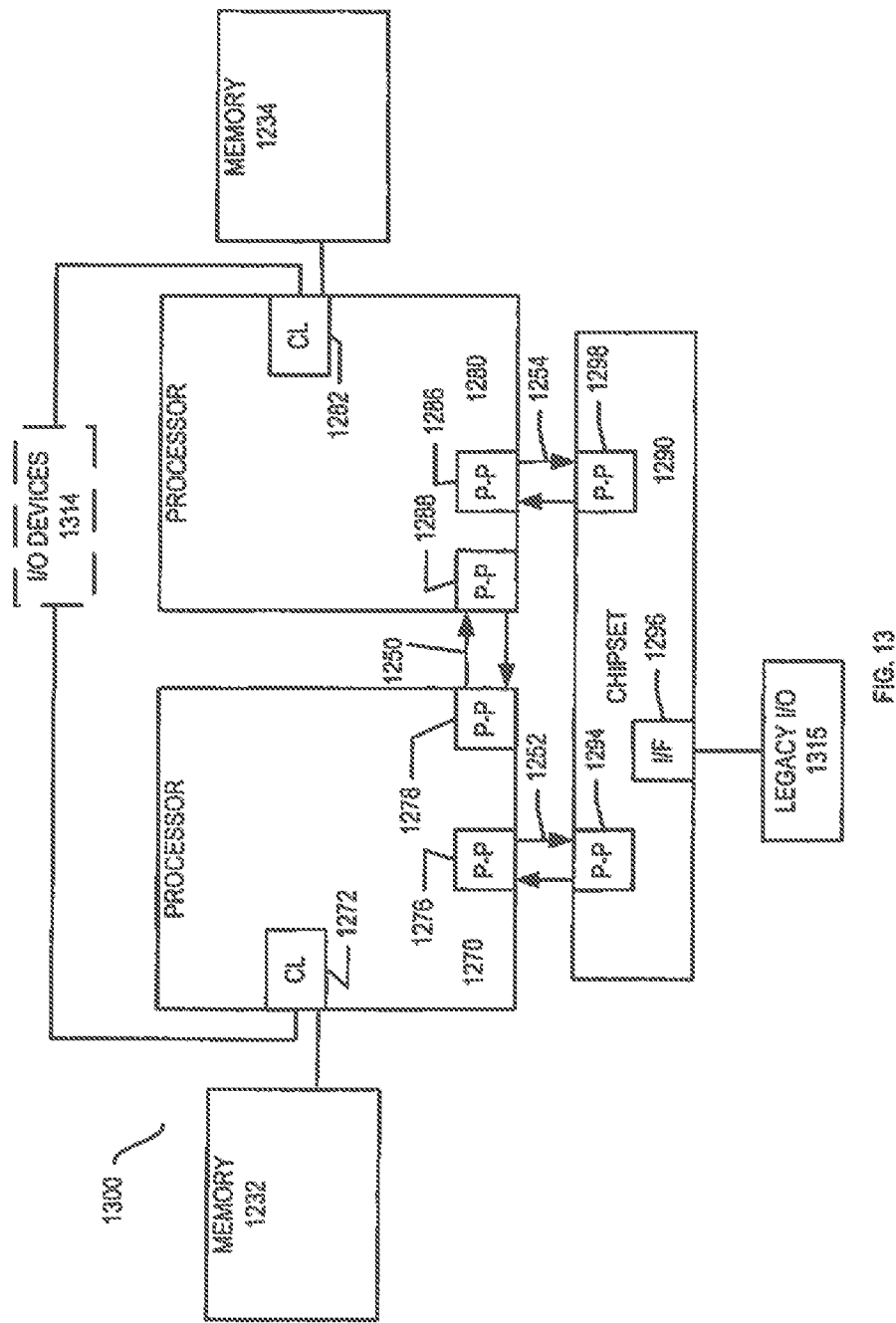
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270,1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
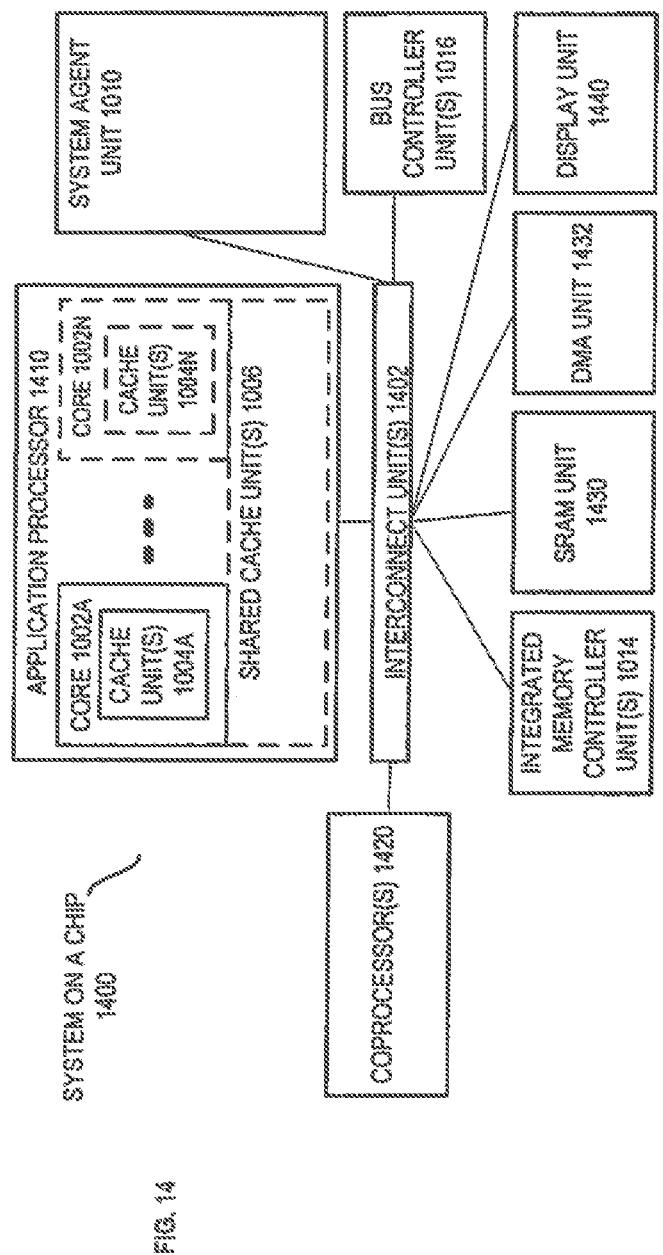
FIG. 14, shown is a block diagram of a system on a chip (SoC) in accordance with art embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 8420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to arty particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software. Firmware, hardware, or various combinations thereof. FIG. 15 shows a program in a high level language 1502 may be compiled using art x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without art x86 instruction set core 1514. This converted code is not likely to be the same as the alternative instruction set binary code 1510 because an instruction converter capable of this is difficult to snake; however, the converted code will accomplish the general operation and be made up of instructions front the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. A hardware apparatus comprising:
a first processor core of a single processor having a cache to store a cache line;
a second processor core of the single processor to send a first request for the cache line from the first processor core;
a third processor core of the single processor to send a second request for the cache line from the second processor core;
moving logic circuitry to cause a move of the cache line from the first processor core to a memory that is separate from a cache of the second processor core and a cache of the third processor core, and to update a tag directory of the move; and
cache line coherency logic circuitry to create a chain home in the tag directory for the first request and the second request to cause the cache line to be sent to the second processor core when the cache line is available, and cause the cache line to be sent to the third processor core after the cache line arrives at the second processor core.

2. The hardware apparatus of claim 1, wherein the move comprises a victim operation to remove the cache line from the first processor core.

3. The hardware apparatus of claim 2, wherein the victim operation is to remove the cache line from a victim buffer of the first processor core.

4. The hardware apparatus of claim 1, wherein the move comprises a back-invalidate operation.

5. The hardware apparatus of claim 4, wherein the chain home comprises an invalid acknowledgement field.

6. The hardware apparatus of claim 1, wherein the chain home comprises a requestor core field.

7. The hardware apparatus of claim 1, wherein the chain home comprises a live field to indicate that the move is in progress and the chain home is created in the tag directory.

8. The hardware apparatus of claim 1, wherein the chain home comprises a filled field to indicate that the second processor core sent the first request for the cache line from the first processor core while the move is in progress.

9. The hardware apparatus of claim 1, wherein the cache line coherency logic circuitry is to create the chain home in the tag directory without blocking the first request and the second request during the move.

10. A method to control cache line coherency comprising:
receiving a first request for a cache line stored in a first processor core of a single processor from a second processor core of the single processor;
receiving a second request for the cache line stored in the second processor core from a third processor core of the single processor;
causing a move of the cache line from the first processor core to a memory that is separate from a cache of the second processor core and a cache of the third processor core, and updating a tag directory of the move; and
creating a chain home in the tag directory for the first request and the second request to cause the cache line to be sent to the second processor core when the cache line is available, and cause the cache line to be sent to the third processor core after the cache line arrives at the second processor core.

11. The method of claim 10, wherein the causing the move comprises performing a victim operation to remove the cache line from the first processor core.

12. The method of claim 11, wherein the performing the victim operation removes the cache line from a victim buffer of the first processor core.

13. The method of claim 10, wherein the causing the move comprises performing a back-invalidate operation.

14. The method of claim 10, wherein the creating the chain home comprises updating a requestor core field.

15. The method of claim 10, wherein the creating the chain home comprises updating a live field to indicate that the move is in progress and the chain home is created in the tag directory.

16. The method of claim 10, wherein the creating the chain home comprises updating a filled field to indicate that the second processor core sent the first request for the cache line from the first processor core while the move is in progress.

17. The method of claim 10, further comprising creating the chain home in the tag directory without blocking the first request and the second request during the move.

18. A hardware system comprising:
a system memory separate from a single processor;
a first processor core of the single processor having a cache to store a cache line;
a second processor core of the single processor to send a first request for the cache line from the first processor core;
a third processor core of the single processor to send a second request for the cache line from the second processor core;
moving logic circuitry to cause a move of the cache line from the first processor core to the system memory and to update a tag directory of the move; and
cache line coherency logic circuitry to create a chain home in the tag directory for the first request and the second request to cause the cache line to be sent to the second processor core when the cache line is available, and cause the cache line to be sent to the third processor core after the cache line arrives at the second processor core.

19. The hardware system of claim 18, wherein the move comprises a victim operation to remove the cache line from the first processor core.

20. The hardware system of claim 19, wherein the victim operation is to remove the cache line from a victim buffer of the first processor core.

21. The hardware system of claim 18, wherein the move comprises a back-invalidate operation.

22. The hardware system of claim 18, wherein the chain home comprises a requestor core field.

23. The hardware system of claim 18, wherein the chain home comprises a live field to indicate that the move is in progress and the chain home is created in the tag directory.

24. The hardware system of claim 18, wherein the chain home comprises a filled field to indicate that the second processor core sent the first request for the cache line from the first processor core while the move is in progress.

25. The hardware system of claim 18, wherein the cache line coherency logic circuitry is to create the chain home in the tag directory without blocking the first request and the second request during the move.

* * * * *